L. CROWELL.
POSITION LOCATING INSTRUMENT.
APPLICATION FILED OCT. 15, 1912.
1,096,492.
Patented May 12, 1914.
2 SHEETS—SHEET 1.
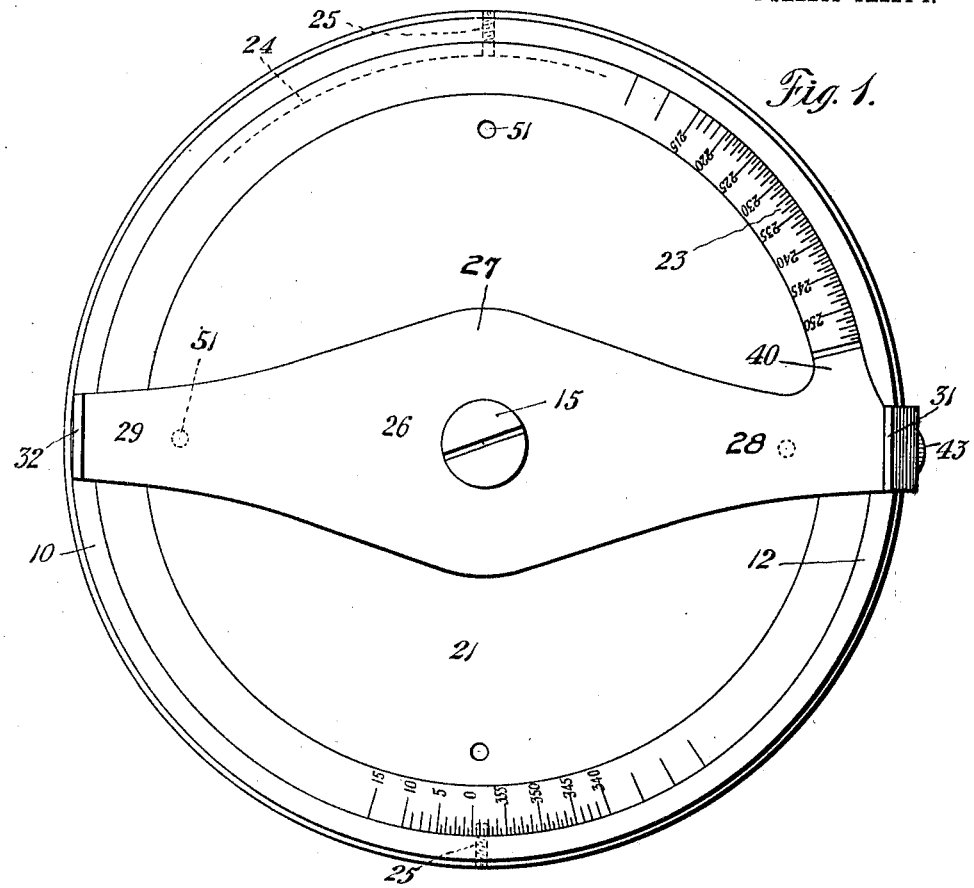
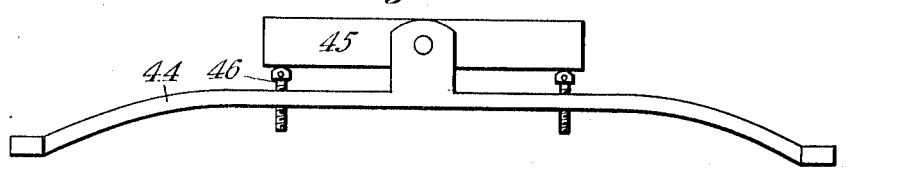
Witnesses
J. W. Michael, Jr.
M. E. Shook
Inventor
Lincoln Crowell
By Edson Bros.
Attorneys

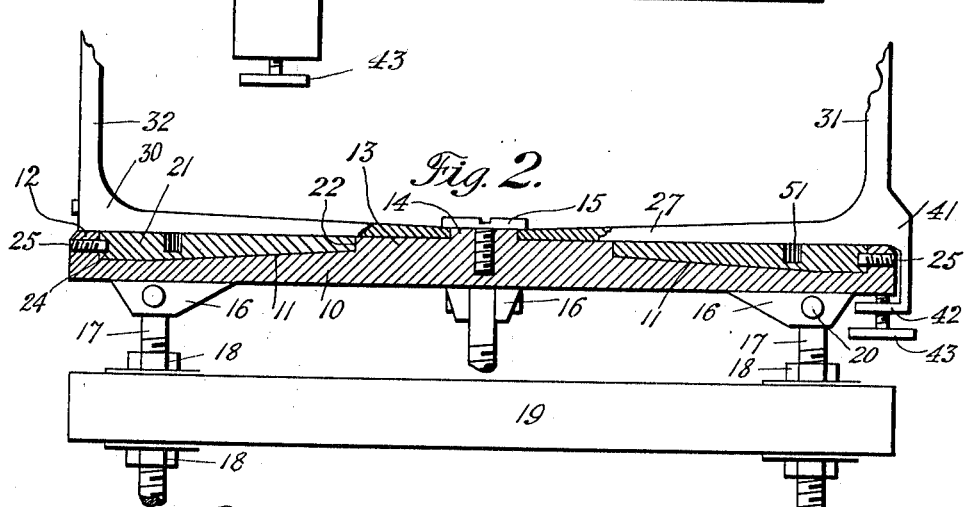

UNITED STATES PATENT OFFICE.

LINCOLN CROWELL, OF BOSTON, MASSACHUSETTS.

POSITION-LOCATING INSTRUMENT.

1,096,492.  Specification of Letters Patent.  Patented May 12, 1914.

Application filed October 15, 1912. Serial No. 725,959.

*To all whom it may concern:*

Be it known that I, LINCOLN CROWELL, a citizen of the United States, residing at Boston, in the county of Suffolk and State of Massachusetts, have invented certain new and useful Improvements in Position-Locating Instruments; and I do hereby declare the following to be a full, clear, and exact description of the invention, such as will enable others skilled in the art to which it appertains to make and use the same.

This invention is a position locating instrument, and is adapted more particularly as an apparatus for accurately determining the position or location of an object, by intersection, such as a forest fire, and the like, without resorting to the employment of the usual surveying instruments and methods.

The invention is equally well adapted as a range finder and for other purposes.

Great damage and loss of property to communities, as well as large forest reservations, have been sustained by forest fires, and to limit this loss to a minimum, it is customary to employ rangers whose duty it is to be constantly on the watch to detect a fire and to promptly direct that men shall be sent to extinguish it. The customary method of locating the position of a fire within a district or reservation is to establish a number of watch stations at convenient distances apart within the district to be guarded, such stations being preferably upon suitable elevations from which the surrounding country may be readily surveyed. Any suitable means of communicating is established between these stations, and when a ranger sights an object to be located, such as a column of smoke, it is necessary for him to note the bearing or azimuth of the smoke and communicate the same, as by telephone or signaling, to a central station, or from one watch station to another. The bearings are then located on a suitable topographic map, and the point of intersection noted thereon, which will give the location of the fire. Many of these rangers are men inexperienced in the use of delicate surveying instruments, and as these observation stations must often be located in regions far distant from human habitation, the instrument employed at these stations must be so constructed as to require the minimum of repairs, as well as to be capable of quick and accurate use by inexperienced men.

A purpose of the invention, therefore, is to provide a simple, durable instrument which may be permanently located at exposed places, and which will facilitate the location of an object by persons inexperienced in the use of delicate surveying instruments, and the like. Another aim of the invention is to facilitate the setting up, adjusting and orienting of the instrument which, when once adjusted, is not liable to require further attention in that respect, or for repairs.

Further objects and advantages of the invention will become apparent from the following detailed description, taken in connection with the drawings.

According to the invention, the instrument comprises a base plate having means for anchoring the same to a foundation after said means have been operated to level the plate, said base plate being combined with an adjustable azimuth plate having a scale, and a peep-sight alidade pivotally mounted upon the base plate in coöperative relation to the azimuth plate, the alidade having an indicator or limb integral therewith which is positioned over the scale of the azimuth plate.

In the accompanying drawings, I have illustrated one embodiment of the invention, in which—

Figure 1 is a plan view of the instrument. Fig. 2 is a sectional view through the same. Fig. 3 is a detail view of the rear sight. Fig. 4 is a detail view of the front sight. Fig. 5 is a side elevation of the device for adjusting the various parts of the instrument. Fig. 6 is a plan view of the striding level, and Fig. 7 is a side elevation of the striding level.

In the drawings, the base plate 10 is shown as circular in form and is channeled out to provide a circular seat 11 and an upstanding peripheral flange 12. The seat 11 is shown as of greater depth at one edge, or near the outer periphery of the base plate, than at its other edge. This plate 10 is provided, also, with the substantially circular bearing surface 13, protruding from which is a circular lug 14. A screw-threaded aperture is provided at substantially the center of this lug 14 to accommodate a binding screw 15, the head of which is of greater diameter than that of the lug 14.

The under face of the base plate 10 is provided with a plurality of lugs 16, quadrantly placed, to each of which is pivotally attached a depending threaded bolt 17, having nuts 18, for the purpose of securing the base plate 10 to the foundation 19, and also adjusting the base plate until it is properly leveled, whereupon said plate may be retained in its adjusted position. These bolts 17 may be turned on their pivots 20 to facilitate shipping, or storing the instrument in a small space.

Adjustably fitted within the seat 11 of the base plate 10 is a disk-like azimuth plate 21, having a large central opening 22 engaging the vertical walls of the bearing surface 13 to facilitate the pivotal movement of the plate with reference to the base plate. This azimuth plate 21 is provided with a scale, 23, near the outer edge thereof. In cross section, this plate 21 is shown as tapering in thickness, being of greatest thickness near its outer edge, and of less thickness at its inner edge, whereby when the plate 21 is positioned within the seat 11, its upper face will be substantially on the same horizontal plane as the upper face of the bearing surface 13 and the upper face of the flange, as shown in Fig. 2.

The azimuth plate 21 is provided with a groove 24 formed in its outer thickened periphery, which is adapted to receive a plurality of set screws 25 positioned in the flange 12. These screws serve to engage the plate 21 at 24, and to lock said plate 21 in its operative position on the base plate 10.

An alidade 26 is rotatably mounted upon the base plate 10 and over the azimuth plate 21. This alidade 26 is shown provided with a broad base 27 which is extended into radial arms 28, 29 reaching to the flange 12 of the base plate. This alidade 26 is shown of greater thickness at 30, where it extends over the flange 12, than at the broad base 27, where the azimuth plate rests upon the bearing surface 13 of the base plate 10. At the outer ends 28, 29 of this alidade 26 are sighting members 31 and 32, respectively, which are shown integral with the alidade 26. The front sight member 32 is provided with an elongated central aperture 33, having a wire 34 extending throughout the length thereof. This wire is secured at the upper end and after passing through holes at opposite ends of said sight-member 32, is drawn taut and secured at the lower by screw 36. The front sight 32 should be of sufficient height for sighting on Polaris. The rear sight 31 is shown channeled out or concave at 37 on one face and slitted, as at 38, for a greater portion of its length, forming a long view aperture. To facilitate quick use of the sights, however, I have provided the peep-sight apertures 39. The arm 28 of the alidade plate is provided, also, with an indicator 40, shown integral with the alidade 26, and positioned over the scale 23. Secured to the lower end of the rear sight 31 is a depending clamping plate 41, having an angular flange 42 through which passes a set screw 43, the end of the shank of which is positioned to engage the end face of the base plate 10 in alinement with the flange 12, whereby when the screw 43 is operated to lock the alidade 26 in its adjusted position, no strain will be imposed upon the pivot 15 of the alidade 26, or any of the adjusting parts.

In Figs. 6 and 7, I have illustrated a striding level 44, having a spirit level 45 pivotally mounted thereon, with adjusting screws 46 adapted to engage the ends of the spirit level.

In Fig. 5 I have shown a tool 47, having arms 48. On the upper surface of this tool is provided an elongated protruding spur 49 serving as a means for engaging the slot of screw 15 for the purpose of turning the screw. Depending from the under side of this tool 47 are studs 50 designed to engage apertures or spanner-holes 51 in the azimuth-plate 21 for the purpose of turning said plate 21 with reference to its base plate 10. One end of the tool is provided with a wrench 52, adapted to engage nuts 18 for the purpose of adjusting base plate 10. At its opposite end, the tool 47 has a knife-like projection 53 serving as means for engaging the slotted end of screws 25 for locking the azimuth plate 21 in its adjusted position on the base plate 10, or permitting the azimuth plate to be oriented. After this plate has been once adjusted, it may be permanently locked in position for the station upon which the instrument is fixed. After the base plate 10 has been placed upon a suitable foundation, the striding level 44 is employed in conjunction with the adjustment of the bolts 17 and nuts 18, to level the plate 10, whereupon this plate is secured in position on the foundation. Plate 21 is seated in the base plate 10, and this azimuth plate is oriented by employing the tool 47, having the lugs 50 thereof engage the spanner-holes 51. This plate 21 is locked in its adjusted position by the screws 25, whereupon the only acts necessary to the operation of the instrument are to swing the alidade into position for observing an object, and noting the azimuth, as indicated by the indicator or wing pointer, carried by the alidade. It will be observed, therefore, that the invention combines stability, simplicity and cheapness of construction, as well as ease in setting up the instrument, adjusting and orienting it. After the instrument has been once installed, the parts are so constructed that it is not liable to require repairs, etc., due to exposure in remote places, or to its use by persons unaccustomed to handling delicate instruments of a similar character.

Having thus explained the nature of my invention, and described an operative manner of constructing and using the same, although without attempting to set forth all of the forms in which it may be made, or all of the forms of its use, what I claim is:—

1. In an instrument for determining ranges, a foundation, a base plate adapted to be secured to the foundation, means for adjusting said base plate on the foundation, an azimuth plate adjustably mounted on said base plate, means for locking the azimuth plate in its adjusted position, and an alidade removably mounted upon said base plate.

2. In an instrument for determining ranges, a foundation, a base plate adapted to be secured to the foundation, pivotal means for adjusting said base plate on the foundation, an azimuth plate fitting within said base plate, said azimuth plate being provided with a groove in its periphery, means on said base plate for engaging the groove of the azimuth plate and for precluding movement of one plate with reference to the other plate, and an alidade pivotally mounted on said base plate.

3. In an instrument for determining ranges, a base plate having a substantially circular seat, a bearing surface and an upstanding lug, an azimuth plate adjustably fitted within said seat, an alidade pivotally mounted upon said base plate and adapted to rest upon the bearing surface thereof, said alidade having a substantially central aperture for the reception of said upstanding lug, and means for locking said alidade to said base plate.

4. In an instrument for determining ranges, a base plate, an azimuth plate adjustably fitted within the base plate, and provided with a scale, an alidade pivotally mounted upon the base plate and coöperating with said azimuth plate, said alidade having a plurality of arms, one arm being provided with one sight member and an indicator, while the other arm is provided with the component sight-member.

5. In an instrument for determining ranges, a base plate, an azimuth plate adjustably fitted on the base plate provided with a scale, means for locking said azimuth plate in position, an alidade pivotally mounted upon the base plate, said alidade having a plurality of arms each provided with a sight member integral therewith, an indicator carried by one arm, and means for locking the alidade in position with reference to the base plate.

6. In an instrument for determining ranges, a base plate, an azimuth plate adjustably fitted on the base plate and provided with a scale, means for locking said azimuth plate in position, an alidade pivotally mounted on the base plate, said alidade having a plurality of arms, a sight-member at the end of one of said arms, another sight-member positioned substantially at the end of the other arm, an indicator projecting from said latter arm, and clamping means depending from said arm and adapted to engage the under face of the base plate.

7. In a device of the class described, a base plate provided with a seat, a bearing surface, an upstanding lug, and means for adjusting said plate with reference to its foundation; an azimuth plate adapted to fit within said seat, and having a plurality of small apertures and a large central aperture; an alidade fitting over said upstanding lug for retaining the alidade in pivotal position, a plurality of screws for locking the azimuth plate in position; and means whereby the base plate may be adjusted with reference to its foundation, the azimuth plate adjusted relative to the base plate, the azimuth plate locked in its operative position, and moving the retaining means of the alidade.

In testimony whereof, I affix my signature, in presence of two witnesses.

LINCOLN CROWELL.

Witnesses:
A. M. PARKINS,
J. W. MICHAEL, Jr.

---

Copies of this patent may be obtained for five cents each, by addressing the "Commissioner of Patents, Washington, D. C."